(12) United States Patent
Goeke

(10) Patent No.: US 9,847,724 B2
(45) Date of Patent: Dec. 19, 2017

(54) POWER SUPPLY HAVING REDUCED TRANSFORMER COMMUTATION NOISE

(71) Applicant: Keithley Instruments, Inc., Cleveland, OH (US)

(72) Inventor: Wayne C. Goeke, Hudson, OH (US)

(73) Assignee: Keithley Instruments, LLC, Solon, OH (US)

(*) Notice: Subject to any disclaimer, the term of this patent is extended or adjusted under 35 U.S.C. 154(b) by 0 days.

(21) Appl. No.: 14/876,538

(22) Filed: Oct. 6, 2015

(65) Prior Publication Data

US 2017/0099000 A1    Apr. 6, 2017

(51) Int. Cl.
*H02M 3/335* (2006.01)
*H02M 3/337* (2006.01)
*H02M 1/34* (2007.01)

(52) U.S. Cl.
CPC ....... *H02M 3/33507* (2013.01); *H02M 3/337* (2013.01); *H02M 3/33569* (2013.01); *H02M 2001/342* (2013.01); *H02M 2001/344* (2013.01); *Y02B 70/1491* (2013.01)

(58) Field of Classification Search
CPC ............. H02M 3/3376; H02M 3/3378; H02M 3/33507; H02M 3/33569; H02M 3/3372
See application file for complete search history.

(56) References Cited

U.S. PATENT DOCUMENTS 4,607,322 A    8/1986  Henderson
4,780,801 A *  10/1988  Gill .................... H02J 9/062
                                                         307/64

(Continued)

FOREIGN PATENT DOCUMENTS

SU         877757        10/1981

OTHER PUBLICATIONS

Wang H et al., "Modeling and Analysis of a Current-Fed ZCS Full-Bridge DC/DC Converter with Adaptive Soft-Switching Energy," Applied Power Electronics Conference and Exposition, 2009, Feb. 15, 2009, pp. 1410-1416, IEEE, Piscataway, NJ.

(Continued)

*Primary Examiner* — Jue Zhang
*Assistant Examiner* — Lakaisha Jackson
(74) *Attorney, Agent, or Firm* — Marger Johnson; Andrew J. Harrington

(57) ABSTRACT

Embodiments of the present invention provide improved techniques and devices for reducing transformer commutation distortion caused by large load currents. Traditional power supplies which have two or more phases typically commutate a transformer during the end of each phase. When the load current is large, energy stored in the transformer's leakage inductance can cause undesirable effects during commutation. Embodiments of the present invention reduce these effects by lowering the voltage across the primary side of the transformer prior to commutation. In one embodiment, a capacitor is added to the primary side of the transformer. A switch directs current through the capacitor prior to commutation, allowing the capacitor to absorb the transformer's leakage inductance energy and lower the primary side voltage. Other suitable components, such as resistors, diodes, transistors, or additional transformer windings, may also be used to reduce the primary-side voltage prior to commutation.

20 Claims, 10 Drawing Sheets

(56) References Cited

U.S. PATENT DOCUMENTS

| | | | | |
|---|---|---|---|---|
| 5,181,160 | A | * | 1/1993 | Okamoto ............ H02M 3/3378 |
| | | | | 219/718 |
| 5,684,680 | A | * | 11/1997 | Tahhan ............. H02M 3/33569 |
| | | | | 363/26 |
| 5,952,817 | A | | 9/1999 | Brewster et al. |
| 6,011,702 | A | * | 1/2000 | Gucyski .................. H02M 1/34 |
| | | | | 363/21.04 |
| 6,040,686 | A | | 3/2000 | Schenkel |
| 6,330,170 | B1 | * | 12/2001 | Wang ...................... H02J 9/062 |
| | | | | 363/17 |
| 6,693,804 | B2 | * | 2/2004 | Suzuki ................... H02M 1/12 |
| | | | | 363/134 |
| 7,423,891 | B2 | * | 9/2008 | Ho ...................... H02M 3/1588 |
| | | | | 363/134 |
| 2006/0139970 | A1 | * | 6/2006 | Cheng ................. H02M 3/3372 |
| | | | | 363/24 |
| 2007/0201249 | A1 | | 8/2007 | Knott |
| 2013/0069582 | A1 | * | 3/2013 | Kimoto ............. H02M 3/33592 |
| | | | | 320/101 |
| 2014/0268903 | A1 | * | 9/2014 | Reiter ................. H02M 3/3376 |
| | | | | 363/21.02 |

OTHER PUBLICATIONS

European Patent Office, Extended European Search Report and Opinion for European Patent Application No. 16192599.5, dated May 4, 2017, 10 pages, EPO, Munich, Germany.

* cited by examiner

POWER SUPPLY HAVING REDUCED TRANSFORMER COMMUTATION NOISE

FIELD OF THE INVENTION

The present invention relates to reducing transformer commutation noise in electrical power supplies.

BACKGROUND OF THE INVENTION

Transformer-based power supplies often cycle between two or more phases when converting a first voltage to a second voltage. Between phases, the transformer will commutate (i.e., reverse the transformer voltage). To allow the transformer to commutate, the power supply must first disconnect the current path on the primary side of transformer. When the power supply has a large load current, however, energy stored in the transformer's leakage inductance may cause problems such as ringing, large voltage spikes, or fast commutations—all of which generate noise that can distort the transformer voltage.

For example, if commutation occurs too quickly, the sudden change of voltage across the transformer can cause an undesirable displacement current—called common mode (CM) current—to flow between the transformer's primary and secondary windings. The speed of the commutation depends on the magnitude of the transformer's magnetization current and the size of the commutation capacitance ($C_c$) that it must charge in order commutate the transformer. One method to slow down the commutation (and reduce the CM current) is to add one or more additional capacitors to the transformer. This effectively increases the commutation capacitance ($C_c$), which is the sum of the normal mode capacitance and any additional capacitors.

But this method does not work well for large load currents. During commutation, the energy stored in the transformer's leakage inductance forces a change of the voltage on $C_c$. This leakage inductance energy ($E_{leakage}$) is related to the load current by the equation $E_{leakage} = \frac{1}{2} L_{leakage} I_{load}^2$, and increases with respect to the load current. By changing the voltage on $C_c$, $E_{leakage}$ may increase the commutation rate (thereby increasing undesirable CM current) when the leakage energy is significant with respect to the commutation energy ($E_c$) (defined as $E_c = \frac{1}{2} C_c V_c^2$, where $V_c$ is the commutation voltage). A significant relationship typically exists when $E_{leakage} \geq E_c/2$. As mentioned above, a larger $E_{leakage}$ may also cause other undesirable effects, such as ringing or large voltage spikes.

One solution for managing larger $E_{leakage}$ caused by high load currents has been to slow the rate at which switches in the power supply disconnect the primary side current. During the transition from on to off, the switch resistance will dissipate some of the leakage inductance energy as heat. A slower switch transition allows the switch to dissipate more leakage energy, and therefore less energy is transferred to the primary capacitance. For very high load currents, however, the switches often get too hot to use this approach.

Thus, there is a need for improved techniques to minimize the effect of large load currents on the transformer commutation.

SUMMARY OF THE INVENTION

Embodiments of the present invention provide improved techniques and devices for reducing load-dependent distortion caused by noise such as ringing, voltage spikes, and common mode (CM) current. A power supply has a transformer and operates in two or more phases. A voltage ($V_p$) is applied to the transformer primary during each phase of operation. To reduce load-dependent distortion, the primary-side voltage is slightly reduced for a short time at the end of each phase of operation. The voltage reduction causes a back pressure on current flow in the transformer's leakage inductance. In response, the power supply's load current tapers to zero, at which time the remaining primary-side voltage ($V_p$) is removed. The transformer's magnetizing current then commutates the transformer, which transitions it to the next phase of operation.

For example, in one embodiment a transition capacitor ($C_t$) is used to reduce the primary-side voltage prior to commutation. $C_t$ may be connected to the primary side of a transformer through one or more switches. Prior to the commutation at the end of each phase, current on the primary side of the transformer is directed through $C_t$, increasing the voltage on $C_t$ and reducing voltage across the transformer. This allows $C_t$ to absorb energy that was stored in the transformer's leakage inductance ($L_{leakage}$) over a time period $\tau$ (where $\tau \propto \sqrt{L_{leakage} \cdot C_t}$) thereby reducing undesirable effects such as ringing, voltage spikes, and CM current—even when the load current is large.

Other embodiments may use any other known method for reducing the primary side voltage. For example, in some embodiments a resistor may be used in place of, or in conjunction with, $C_t$ in order to dissipate the leakage inductance energy. Any other known method may also be used to reduce the primary side voltage. For example, through the use of components such as resistors, diodes, transistors, voltage sources, or by temporarily increasing the number of primary-side windings to reduce the voltage across the primary side of the transformer.

By reducing the transformer's primary-side voltage prior to commutation, the improved power supply is able to reduce undesirable effects that would otherwise be caused by larger load currents such as ringing, voltage spikes, and CM current.

DETAILED DESCRIPTION OF THE INVENTION

Figure 1:
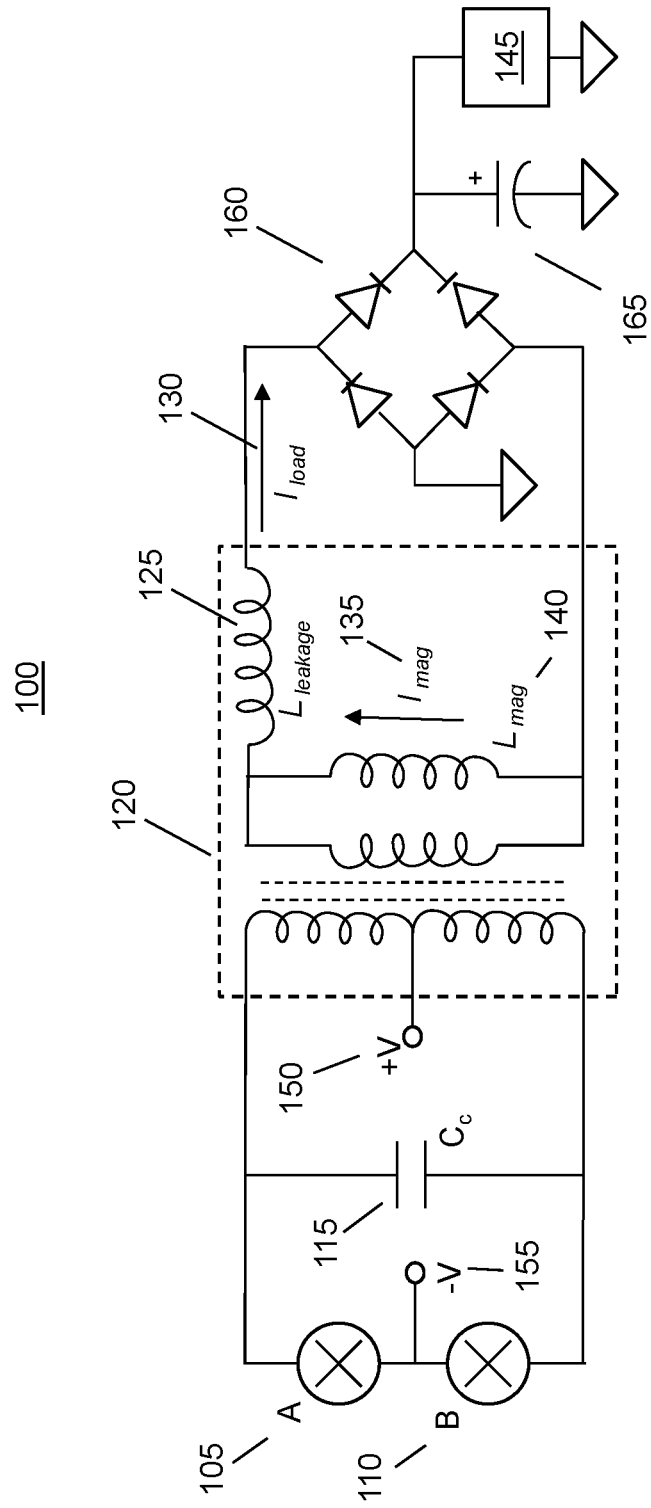
FIG. 1 depicts a prior art power supply with two phases.

FIG. 1 shows an exemplary prior art zero voltage switching ("ZVS") power supply 100. A controller (not shown) operates power switches A 105 and B 110 to provide an alternating voltage across the transformer 120 based on a DC voltage supplied by power terminals 150 and 155. The voltage across the transformer 120 produces a magnetization current ($I_{mag}$) 135 through the transformer's magnetization inductance ($L_{mag}$) 140 and a load current ($L_{load}$) 130 through the transformer's leakage inductance ($L_{leakage}$) 125. Rectifying the load current creates an output voltage and current at the load device 145. For example, in one embodiment diode bridge 160 and load capacitor 165 may be used to rectify the transformer output. Each load device may draw a different amount of current for a given voltage, and even a single load device may draw different amounts of current at different times. Capacitance $C_c$ 115 in FIG. 1 represents the total capacitance across the transformer's primary winding, which consists of the transformer's normal mode capacitance along with any additional capacitors.

Figure 2:
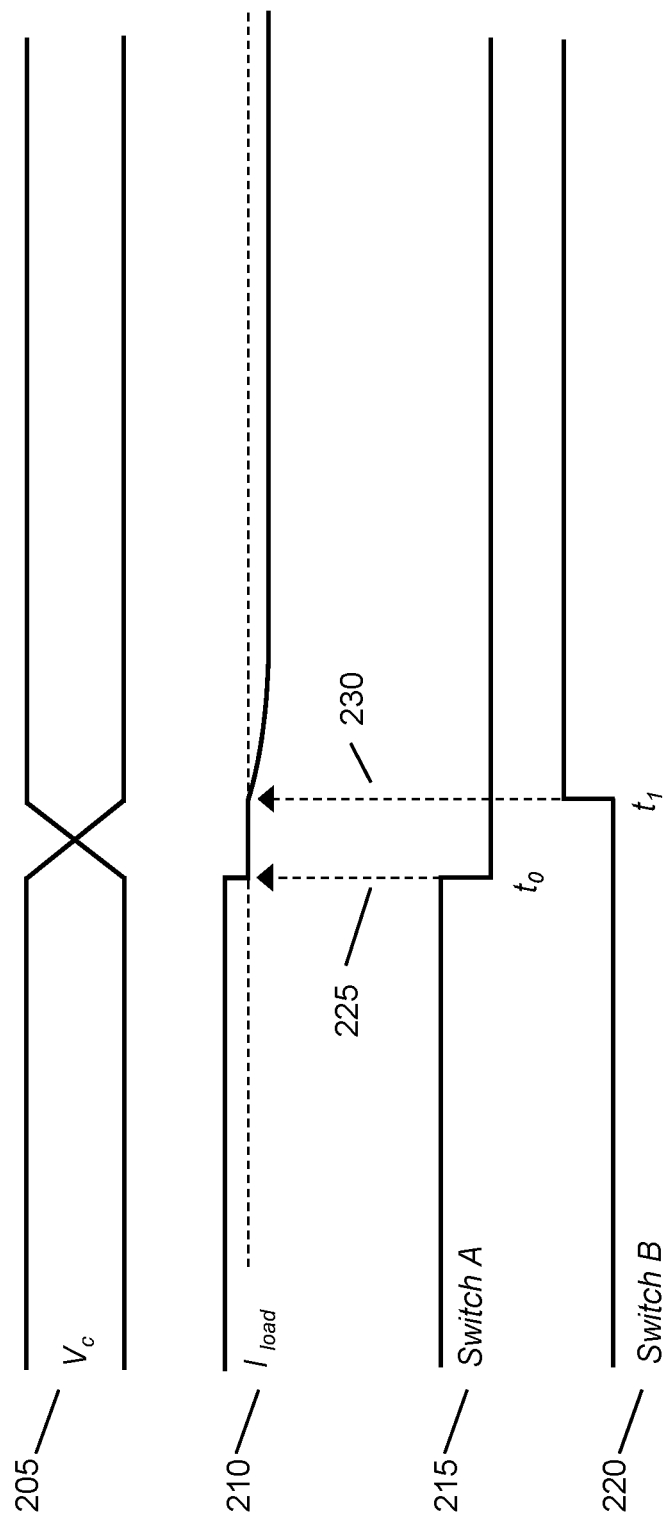
FIG. 2 depicts an exemplary commutation during one phase of a prior art power supply under low load current.

FIG. 2 depicts a typical sequence of events for one phase of the prior art ZVS power supply 100 when the load current is low. Initially in this example, switch A 105 is on and switch B 110 is off, as shown by plots 215 and 220, respectively. To commutate the transformer, switch A 105 turns off, causing the load current 130 to become zero at time $t_0$ 225, as shown by plot 210. At this point, the transformer commutation begins, as shown by plot 205. Note that plot 205 depicts the two voltages at each end of the transformer's 120 primary winding. After the commutation is complete, switch B 110 turns on at time $t_1$ 230. This allows the load current 130 to return to its previous magnitude, although the current is now flowing in the opposite direction, as shown by plot 210.

During commutation, some energy is transferred from the transformer's leakage inductance 125 ($L_{leakage}$) to capacitance 115 ($C_c$). Sufficiently large load currents may cause the leakage energy to introduce noise into the commutation voltage ($V_c$) 205. This can occur, for example, when the leakage energy is significant relative to the commutation energy ($E_c$) (i.e., when $E_{leakage} \geq E_c/2$). The relationship between leakage energy ($E_{leakage}$) and load current ($I_{load}$) can be defined as:

$$E_{leakage} = \tfrac{1}{2} \cdot L_{leakage} \cdot I_{load}^2 \qquad [\text{Eq 1}]$$

Likewise, the commutation energy ($E_c$) can be defined as:

$$E_c = \tfrac{1}{2} \cdot C_c \cdot V_c^2 \qquad [\text{Eq 2}]$$

Figure 3:
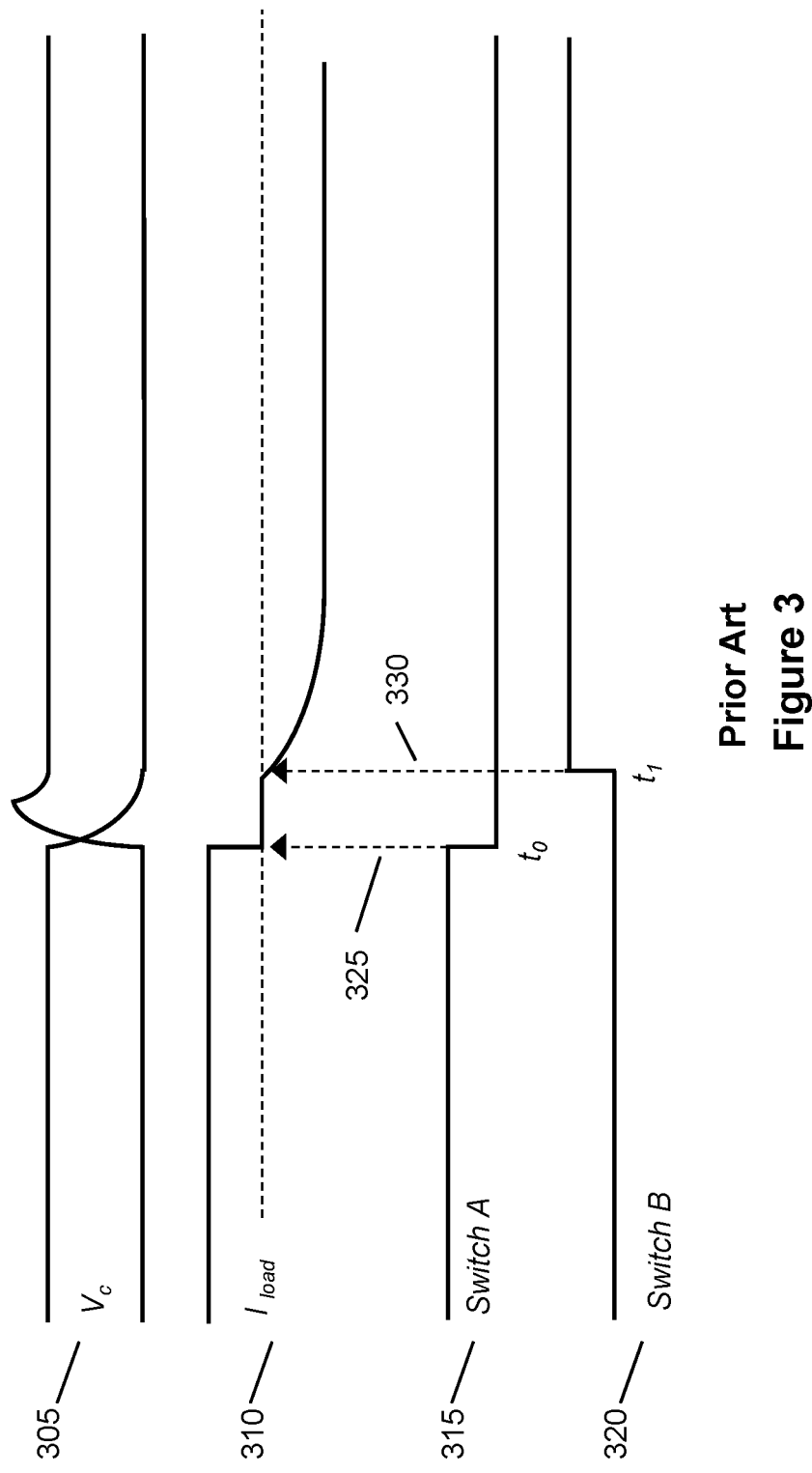
FIG. 3 depicts an exemplary commutation during one phase of a prior art power supply under high load current.

This phenomenon is illustrated in FIG. 3. In FIG. 3, switch A 105 turns off at time $t_0$ 325, and switch B 110 turns on at time $t_1$ 330, as shown by plots 315 and 320. But because the load current 130 is larger, as shown by plot 310, more energy is transferred to the capacitance ($C_c$) 115 during commutation. As a result, the commutation voltage ($V_c$) becomes distorted, as shown by plot 305 in FIG. 3.

The distortion that is introduced into the voltage on $C_c$ (referred to here as $V_c$) can be shown to be:

$$V_c = I_{load} \cdot \sqrt{\frac{L_{leakage}}{C_c}} \qquad [\text{Eq 3}]$$

As shown in Eq 3, the load current has the biggest single impact on the commutation voltage distortion. And (as shown by Eq 2) the commutation voltage, in turn, has the largest impact on commutation energy. Thus, the load current has a large impact on both the commutation voltage distortion and the commutation energy.

In theory, this impact could be reduced by using a larger capacitance ($C_c$) or by decreasing the leakage inductance ($L_{leakage}$). But in practice, neither option is feasible. The capacitance $C_c$ must be a specific value in order to achieve the desired commutation rise/fall time, and usually cannot be changed. In some cases it may be possible to reduce $L_{leakage}$, but usually it cannot be reduced enough to eliminate the commutation distortion.

Thus, a better option is to reduce the load current's effect on the commutation voltage. Embodiments of the present invention achieve this by transferring the majority of the leakage energy ($E_{leakage}$) to a different, larger, capacitor. This reduces the amount of $E_{leakage}$ that is transferred to $C_c$ which, in turn, reduces the commutation distortion.

Figure 4:
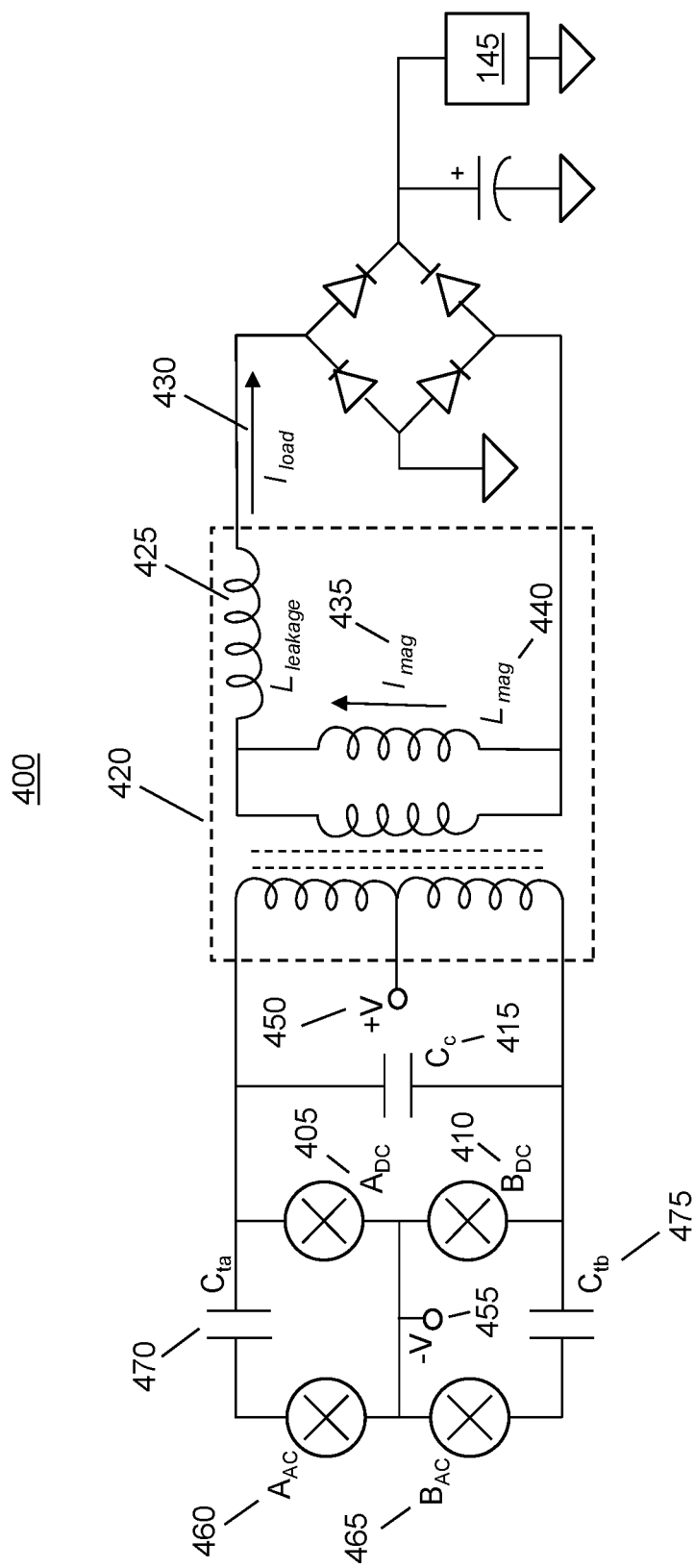
FIG. 4 depicts an exemplary embodiment of an improved power supply.

FIG. 4 depicts one embodiment of an improved zero-voltage switching (ZVS) power supply 400 that has two input power terminals 450 and 455. As shown in FIG. 4, two "AC" power switches ($A_{AC}$ 460 and $B_{AC}$ 465) are each connected to a series capacitor ($C_{ta}$ 470 and $C_{tb}$ 475, respectively). Each series combination is connected in parallel with a "DC" power switch ($A_{DC}$ 405 and $B_{DC}$ 410, respectively). Each "DC" switch ($A_{DC}$ 405 or $B_{DC}$ 410) is on during a different phase of operation, in order to provide alternate current paths to ground. Prior to commutation, the active "DC" power switch ($A_{DC}$ 405 or $B_{DC}$ 410) turns off. At that point, the primary side current is sent through the respective "AC" switch ($A_{AC}$ 460 and $B_{AC}$ 465) and capacitor ($C_{ta}$ 470 and $C_{tb}$ 475, respectively). As long as the capacitances of $C_{ta}$ 470 and $C_{tb}$ 475 are larger than the capacitance of $C_c$ 415, most of the energy stored in $L_{leakage}$ 425 will be transferred to $C_{ta}$ 470 or $C_{tb}$ 475 instead of $C_c$ 415. Once the energy has been transferred, the "AC" switch ($A_{AC}$ 460 or $B_{AC}$ 465) turns off to disconnect $C_{ta}$ 470 or $C_{tb}$ 475 from the circuit, respectively. The magnetization current $I_{mag}$ 435 then commutates the transformer 420 by reversing the voltage on $C_c$ 415.

Figure 5:
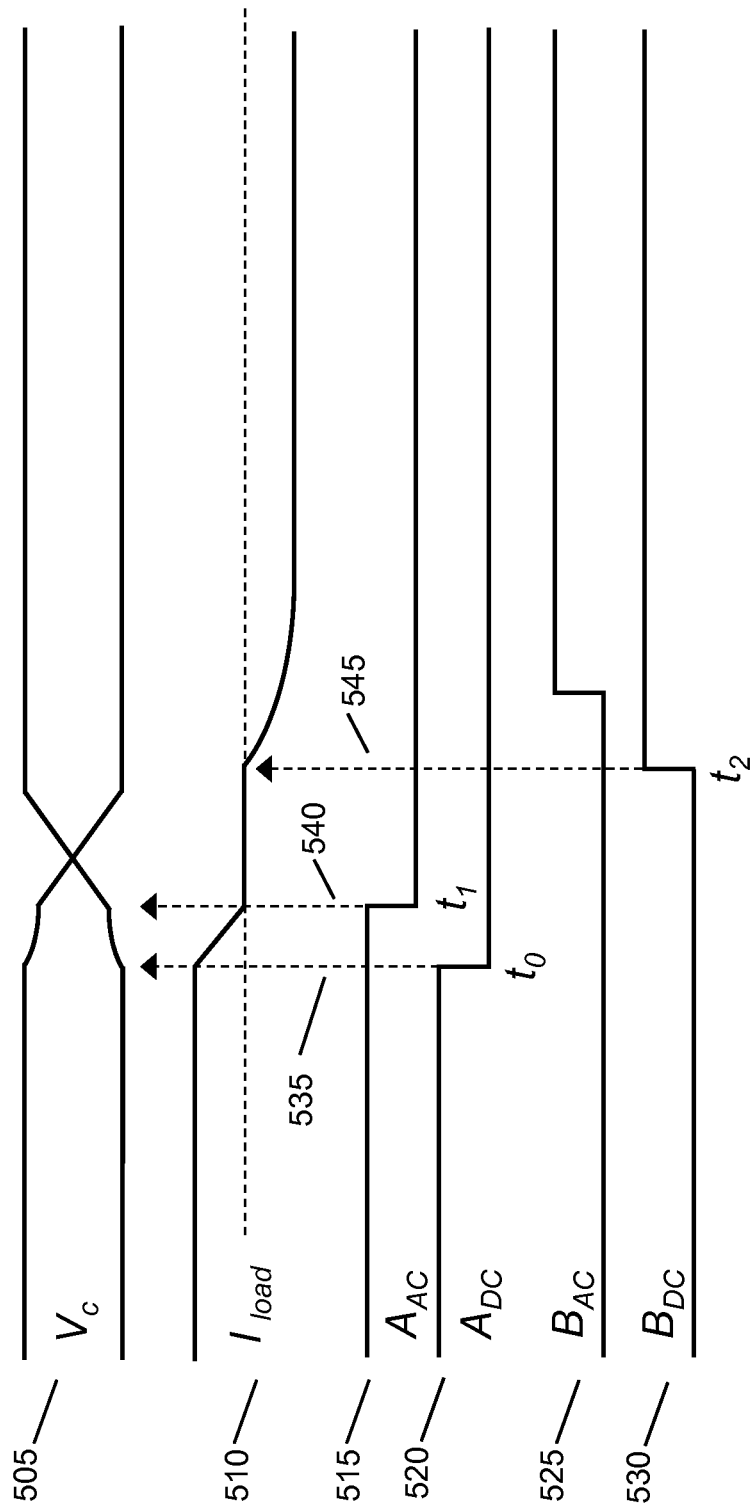
FIG. 5 depicts a first exemplary commutation during a first phase of an improved power supply.

FIG. 5 illustrates an exemplary sequence of events for one phase of the improved power supply 400 of FIG. 4. Prior to time $t_0$ 535, switches $A_{AC}$ 460 and $A_{DC}$ 405 are on while switches $B_{AC}$ 465 and $B_{DC}$ 410 are off, as shown by plots 515, 520, 525, and 530, respectively. At time $t_0$ 535 switch $A_{DC}$ 405 turns off. This causes leakage inductance energy to begin transferring to $C_{ta}$ 470. The energy transfer decreases $V_c$ 505 in turn causing the load current 430 to decrease, as shown by plot 510. Once the load current 430 reaches zero, all of the energy has been transferred. Shortly after the load current 430 reaches zero, switch $A_{AC}$ 460 turns off in order to disconnect $C_{ta}$ 470, as shown by plots 430 and 515. This allows the commutation to begin at time $t_1$ 540. After the commutation has finished, switch $B_{DC}$ 410 turns on at $t_2$ 545, and allows the load current to increase in the opposite direction, as shown by plot 530. Switch $B_{AC}$ 465 may also turn on, in order to prepare for the next commutation, as shown by plot 525. Because most of the leakage inductance energy is transferred to $C_{ta}$ 470 instead of $C_c$ 415, the load current 430 has a much smaller effect on the commutation voltage 505.

Figure 6:
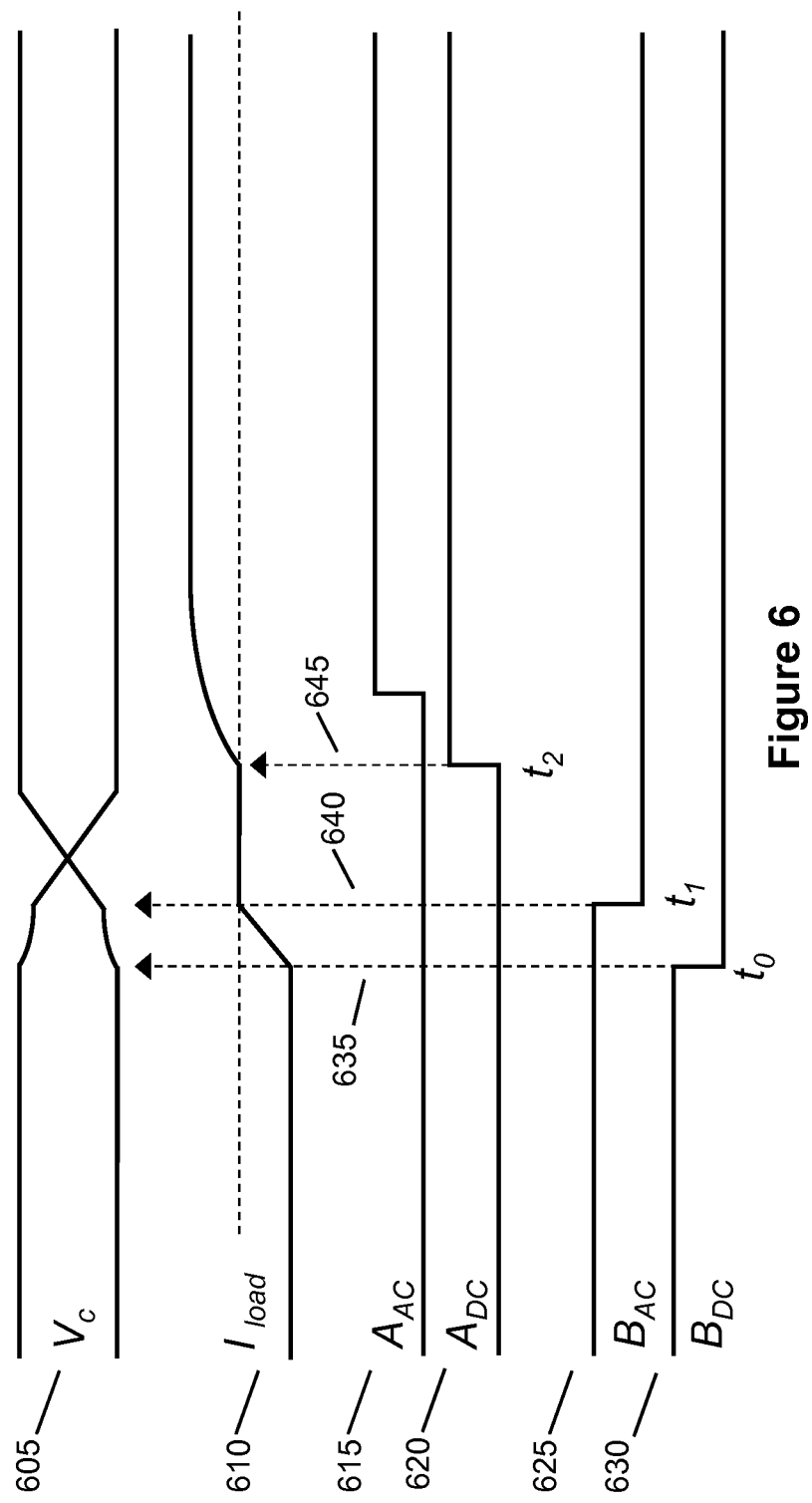
FIG. 6 depicts a second exemplary commutation during a second phase of an improved power supply.

FIG. 6 illustrates the power supply's second phase, starting from the state where switches $B_{DC}$ 410 and $B_{AC}$ 465 are on and $A_{DC}$ 405 and $A_{AC}$ 460 are off, as shown by plots 630, 625, 620, and 615, respectively. At time $t_0$ 635, switch $B_{DC}$ 410 turns off and the leakage inductance energy begins transferring to $C_{tb}$ 475, as shown by plot 630. The energy transfer Vc 605, in turn decreasing the magnitude of load current 430, as shown by plot 610. After the energy has transferred and the load current 430 reaches zero, switch $B_{AC}$ 465 turns off and the commutation begins at time $t_1$ 640, as shown by plots 610 and 625. After the commutation has finished, switch $A_{DC}$ 405 turns on at time $t_2$ 645, allowing the load current to increase in the opposite direction, as shown by plots 610 and 620. Switch $A_{AC}$ 460 can also be turned on, in order to prepare for the next commutation. At this point, the power supply will be in its first phase again, and continues this cycle as long as it is operating.

Figure 7:
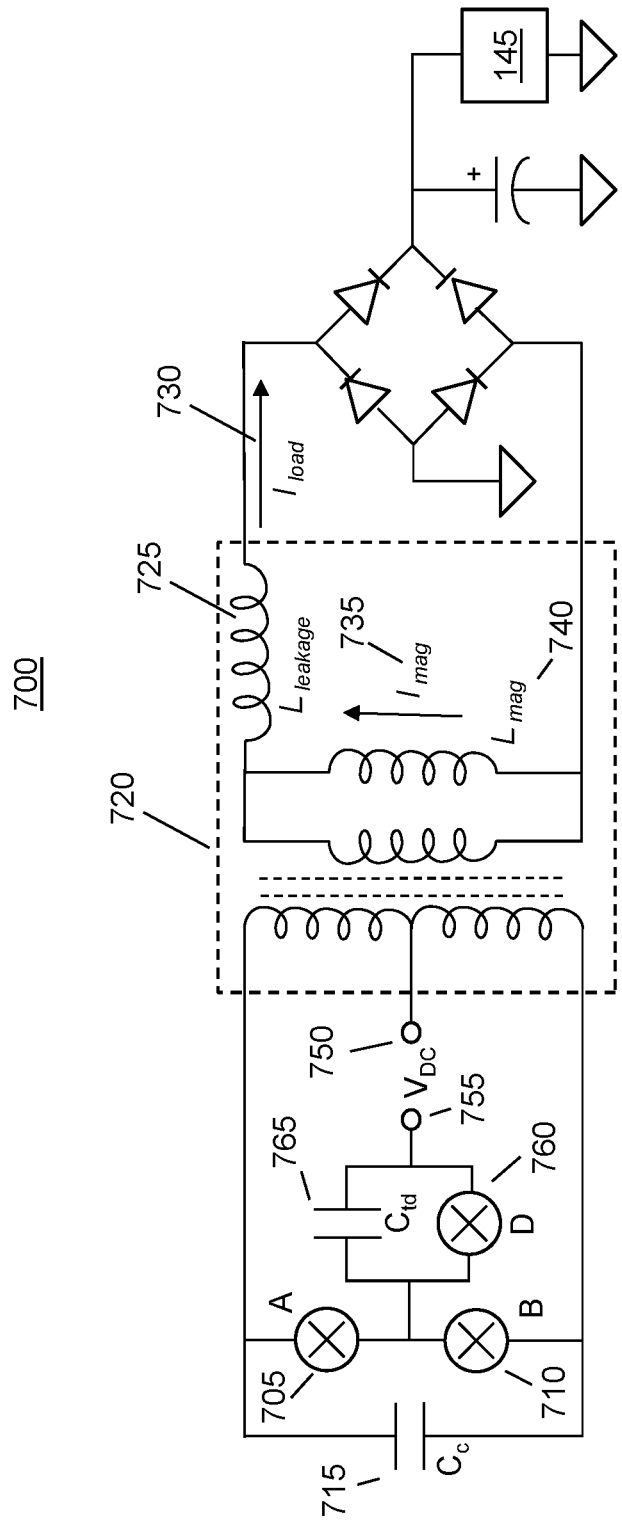
FIG. 7 depicts a second exemplary embodiment of an improved power supply.

Other embodiments may use a single switch and transition capacitor $C_t$, as shown in FIG. 7. In the power supply 700 shown in FIG. 7, DC voltage terminals 750 and 755 supply a voltage to the primary side of transformer 720. Switch D 760 is connected in parallel with a transition capacitor $C_{td}$ 765. When switch D 760 is on, it provides a DC path for the primary side current. Prior to commutation, however, switch D 760 turns off and directs the current through the AC path created by $C_{td}$ 765. This allows $C_{td}$ 765 to absorb the leakage inductance energy ($E_{leakage}$), thereby reducing the commutation noise as discussed above.

During one phase of the power supply, for example, switches A 705 and D 760 may be on while switch B 710 is off. Prior to commutation, switch D 760 turns off and directs the current through $C_{td}$ 765. Once the load current 730 reaches zero, switch A 705 also turns off and allows the transformer 720 to commutate. During commutation, switch D 760 may turn back on, in order to establish a DC current path for the next phase of operation. After the commutation has completed, switch B 710 turns on and the power supply will be in its next phase.

Figure 8:
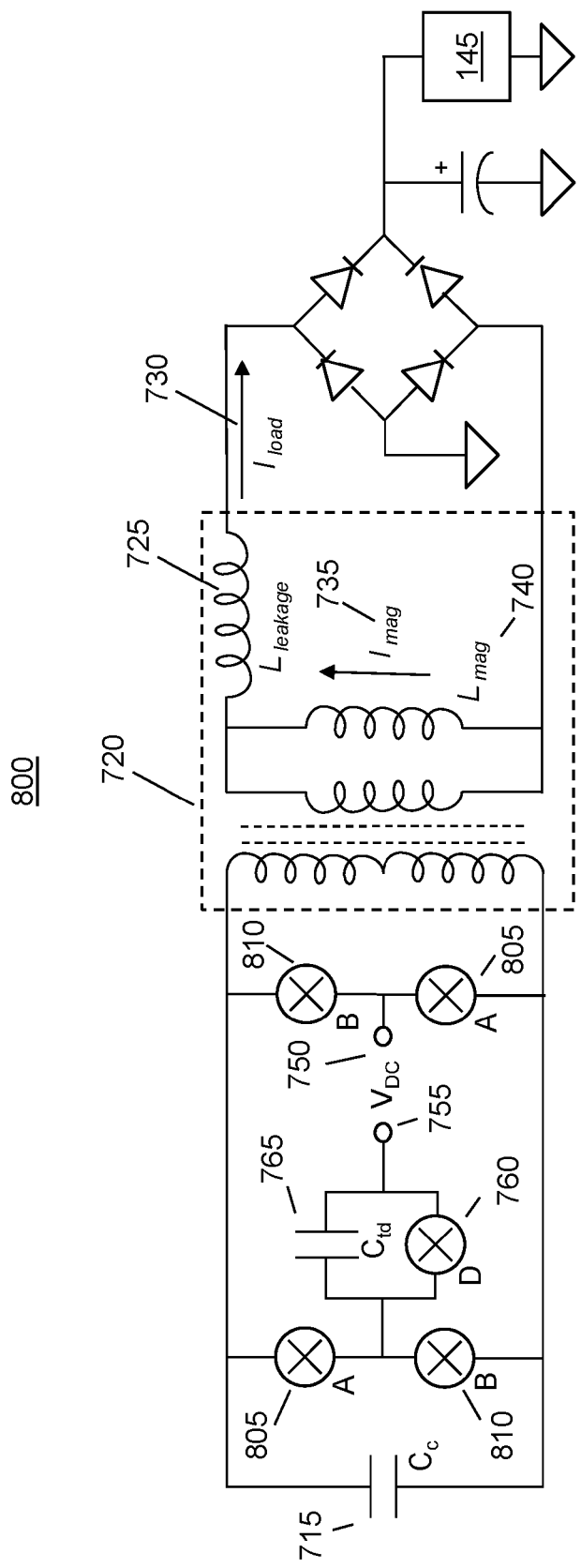
FIG. 8 depicts a third exemplary embodiment of an improved power supply.

Although FIG. 7 depicts a "push-pull" type of power supply, this invention may also be embodied in other types of power supplies. For example, FIG. 8 shows an exemplary embodiment of a full bridge power supply. The power supply 800 shown in FIG. 8 functions the same as the power supply 700 in FIG. 7, but switches A 705 and B 710 switches are replaced by a pair of A switches 805 and B switches 810. Both A switches 805 share the same state, and both B switches 810 share the same state. As in FIG. 7, switch D 760 provides a DC path for the primary side current when the switch is on, and allows $C_{td}$ 865 to absorb energy when the switch is off.

Figure 9:
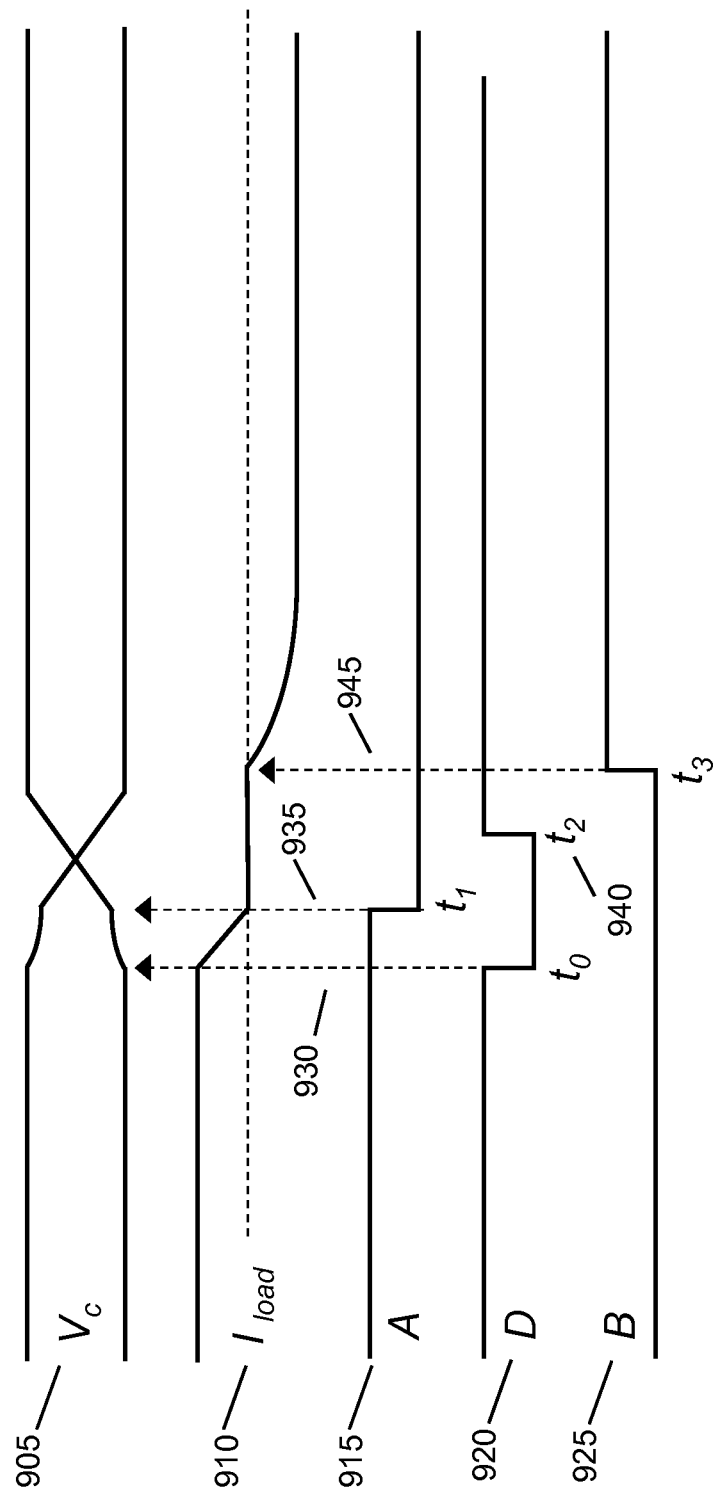
FIG. 9 depicts a third exemplary commutation during one phase of an improved power supply.

FIG. 9 depicts an exemplary sequence of events for one phase of a power supply that has a single transition capacitor $C_t$, such as the power supplies 700 and 800 in FIGS. 7 and 8. Prior to time $t_0$ 930, the A switches (705 or 805) and D switches 760 are on, while the B switches (710 or 810) are off, as shown by plots 915, 920, and 925, respectively. At time $t_0$ 930, switch D 760 turns off, providing a current path through $C_{td}$ 765, as shown by plot 920. At this point, leakage inductance energy begins transferring to $C_{td}$ 765 and the load current begins decreasing, as shown by plot 910. Once the load current reaches zero, the A switches (705 or 805) turn off, allowing the transformer to commutate at time $t_1$ 935. Switch D 760 may turn on again at time $t_2$ 940, in order to provide a DC current path for the next phase of operation. After commutation has completed, the B switches (710 or 810) turn on at time $t_3$ 945, and the power source begins its next phase of operation. In its next phase, the power supply will perform a similar sequence of events, with the operations of the A switches (705 or 805) and B switches (710 or 810) reversed. In a two-phase power supply, this will return the power supply to its first phase. This cycle will repeat as long as the power supply is operating.

Figure 10:
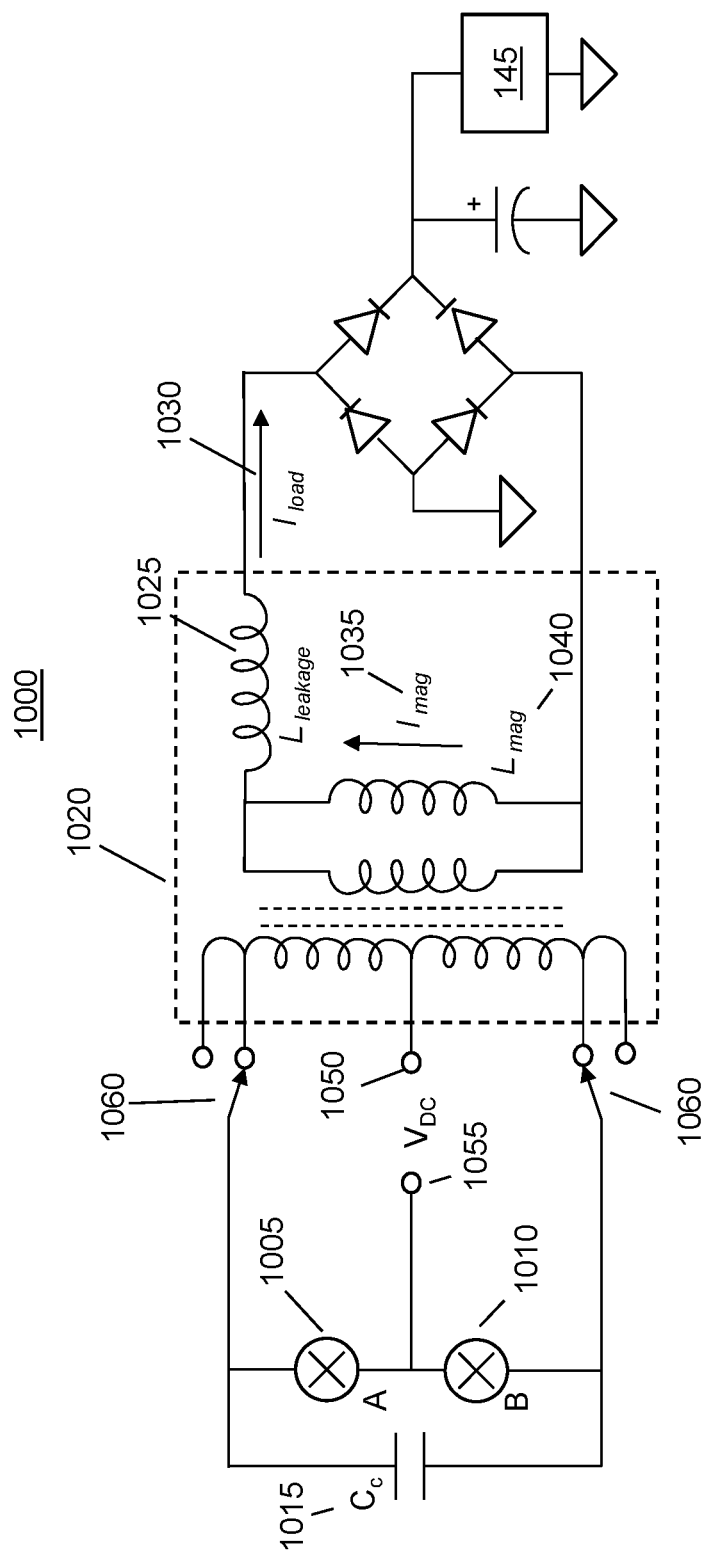
FIG. 10 depicts a fourth exemplary embodiment of an improved power supply.

Although the embodiments discussed in FIGS. 4-9 use one or more capacitors to absorb $E_{leakage}$, in other embodiments, one or more resistors, diodes, transistors, voltage sources (e.g., batteries), or other components may replace or be combined with $C_t$. For example, in one embodiment, the primary-side current may be sent through additional primary windings to reduce the primary-side voltage. As shown in FIG. 10, power supply 1000 uses switches 1055 to reduce the primary-side voltage prior to commutation. During each phase of operation, switches 1055 connect to the inside contacts, providing a current path through a smaller number of windings. Near the end of each phase of operation, switches 1055 connect to additional primary-side windings, effectively reducing the primary-side voltage. After commutation is complete, switches 1055 re-connect to the smaller number of windings. Although the embodiment shown in FIG. 10 uses two switches, fewer or more switches may be used in other embodiments.

Although specific embodiments of the invention have been described for purposes of illustration, it will be apparent to those skilled in the art that various modifications may be made without departing from the spirit and scope of the invention. For example, it will be readily apparent that the invention may be embodied in other types of power supplies, including power supplies that do not use zero-voltage switching, or that have more than two phases. Accordingly, the invention should not be limited except as by the appended claims.

What is claimed is:

1. A power supply that has at least two phases, comprising:
    first and second power terminals;
    a transformer that has at least one primary winding coupled to the first power terminal;
    a first switch, configured to couple a first side of the primary winding to the second power terminal during a first state of the first switch;
    a second switch, configured to couple a second side of the primary winding to the second power terminal during a first state of the second switch; and
    a third switch that has at least a first state and a second state, configured to provide a current path through the third switch during the first state of the third switch, and to reduce the magnitude of a voltage across the primary winding during the second state of the third switch.

2. The power supply of claim 1, wherein
    the third switch is coupled to the second power terminal;
    the third switch is coupled to a capacitor; and
    the third switch is configured to provide a current path through the capacitor when the third switch is in the second state.

3. The power supply of claim 2, wherein the capacitance of the capacitor is larger than a capacitance across the primary winding.

4. The power supply of claim 1, wherein
    the third switch is coupled to a resistor;
    the third switch is coupled to the second power terminal; and
    the third switch is further configured to provide a current path through the resistor when the third switch is in the second state.

5. The power supply of claim 1, wherein the third switch;
    is configured to provide a current path through a first number of primary windings when the third switch is in the first state; and
    is configured to provide a current path through a second number of primary windings when the third switch is in the second state.

6. The power supply of claim 1, configured to change the third switch to its second state at a first time, and to change the first switch or second switch from a first state to a second state once a load current in the power supply has substantially reached zero.

7. A power supply, comprising:
first and second power terminals;
a transformer that has at least one primary winding coupled to the first power terminal;
a first switching circuit, configured to couple a first end of the primary winding to the second power terminal when the first switching circuit is in a first state;
a second switching circuit, configured to couple a second end of the primary winding to the second power terminal when the second switching circuit is in a first state; and
wherein the first and second switching circuits each comprise:
a series arrangement comprising a first switch connected in series to a capacitor; and
a second switch, connected in parallel to the series arrangement.

8. The power supply of claim 7, wherein the capacitors in the first and second switching circuits have substantially the same capacitance.

9. The power supply of claim 7, wherein the capacitance of at least one capacitor is larger than a capacitance across the primary winding.

10. The power supply of claim 7, configured to turn off a second switch in the first or second switching circuit at a first time, and to turn off the first switch in the same first or second switching circuit once a load current in the power supply has substantially reached zero.

11. A power supply, comprising:
first and second power terminals;
a transformer that has at least one primary winding coupled to the first power terminal;
a first switching circuit coupled in parallel to the primary winding, wherein the first switching circuit comprises a first switch connected in series to a second switch; and
a second switching circuit, comprising a third switch connected in parallel to a capacitor;
wherein one end of the second switching circuit is coupled to the second power terminal and the other end of the second switching circuit is connected to the first switching circuit at a point between the first and second switches.

12. The switching circuit of claim 11, configured to turn off the third switch at a first time, and to turn off one of the first or second switches at a second time, once a load current of the power supply has reached substantially zero.

13. The switching circuit of claim 11, wherein the capacitance of the capacitor is larger than a capacitance across the primary winding.

14. A method of operating a power supply that has a transformer with at least one primary winding, the method comprising:
applying a voltage having a first magnitude and polarity to the primary winding for a first period of time;
prior to commutating the transformer, reducing the voltage magnitude to a second value that is substantially greater than zero, for a second period of time; and
disconnecting the applied voltage for a third period of time while the transformer commutates.

15. The method of claim 14, wherein the method is repeated after the commutation is complete, with substantially the same the voltage magnitudes but an opposite voltage polarity.

16. The method of claim 14, wherein the second voltage magnitude is at least eighty percent of the first voltage magnitude.

17. The method of claim 14, wherein the step of reducing the voltage magnitude to a second value comprises directing a current path of the primary winding to flow through one or more components in order to reduce the magnitude of the voltage across the primary winding.

18. The method of claim 17, wherein at least one of the components is a capacitor.

19. The method of claim 17, wherein at least one of the components is a resistor.

20. The method of claim 14, wherein the step of reducing the voltage magnitude to a second value comprises directing a current path that flows through a first number of primary windings to flow through a second, larger, number of primary windings.

* * * * *